March 13, 1945.  N. HALL  2,371,440
MANUFACTURE OF SMALL DRILLED AND TAPPED PARTS
SUCH AS HEXAGON AND OTHER NUTS
Filed April 10, 1944
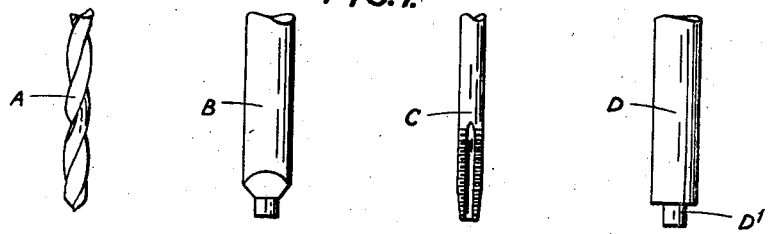
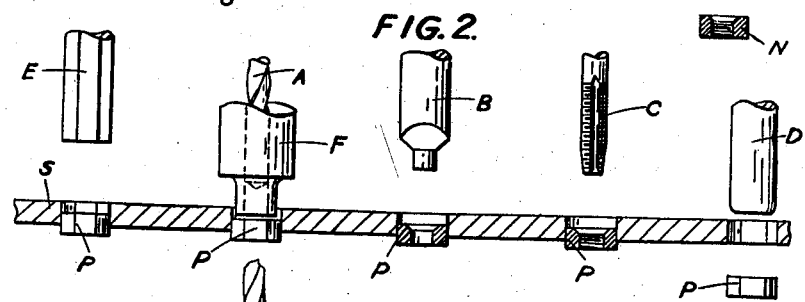
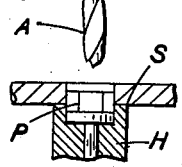
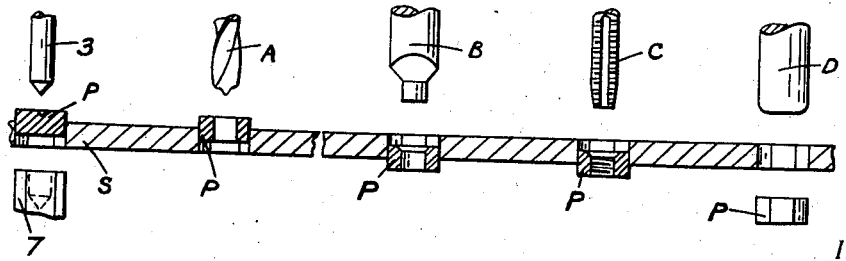
Inventor.
NORMAN HALL.
By
Attorney.

Patented Mar. 13, 1945

2,371,440

UNITED STATES PATENT OFFICE 2,371,440

MANUFACTURE OF SMALL DRILLED AND TAPPED PARTS SUCH AS HEXAGON AND OTHER NUTS

Norman Hall, Durham, England

Application April 10, 1944, Serial No. 530,342
In Great Britain September 9, 1942

6 Claims. (Cl. 10—86)

This invention relates to the manufacture of small drilled and tapped parts such as hexagon and other nuts, by pressing or stamping from sheet or strip material.

Hitherto nuts have been produced by press tools which were arranged to pierce the hole and to blank out the shape of the nut, either in sequence as in the follow-on type of press tool, or simultaneously as in the compound type of press tool, the blanked out pieces being subsequently tapped in machines arranged to grip each blank individually. Such methods have drawbacks when it comes to the production of very small tapped parts such as nuts, for example, the awkwardness in handling the individual small part, the location and holding, and the distortion of the part during the subsequent operations.

It is the object of the present invention to provide a method of manufacture of such small tapped parts from sheet or strip—hereinafter referred to as the stock—in which the above drawbacks are obviated, and a finished product of greater accuracy obtained than has hitherto been possible with known methods, and at the same time gauging of the tapping facilitated.

According to the invention the forming of the hole and the tapping are effected prior to the piece being ejected from the stock.

The invention will now be described by way of example with reference to the accompanying drawing.

In the said drawing:

Figs. 1 to 4 are semi-diagrammatic views showing the successive steps of alternative processes.

Referring more particularly to Fig. 1, S is the metal stock—for example a strip of brass—from whiche the hexagon nuts are to be made. First a hole is drilled at S' by a drill A. By drilling is to be understood any method of forming a hole, whether by punch or rotary drill. The hole is then countersunk by a countersink B, and then it is tapped by a tap C. The stock S is then passed through the press for blanking out by means of the blanking tool D the resulting nut N around the tapped hole. This method may be carried out in accordance with well known press work practice, the blanking tool D having a pilot D' to enter the tapped hole with a view to obtaining correct registration; or the stock may have a previously punched out saw-tooth edge engaging a pawl-type stop incorporated in the die, as is well known.

The above method has the disadvantage that if the wall thickness of the nut or other part to be formed is not great enough, the blanking operation tends to close in the tapped hole. For example, it has been found that full hexagon nuts of British Association standard proportions cannot be satisfactorily made by any of the foregoing methods—known or according to the above particular process of the invention. An obvious remedy is to use oversize taps, but this does not tend to accuracy of manufacture, and is in the nature of a hit-and-miss method.

Fig. 2 shows another method of manufacture which overcomes this difficulty, and which is particularly adapted for the manufacture of such nuts and pieces. The first operation is the blanking by a blanking tool E, but with the blank P only partially ejected from the stock. The stock S is then passed under a drilling machine which is provided with a locator F of circular form having a diameter to allow it just to enter the matrix left by the partially ejected blank, the said locator being arranged to be coaxial with the drill A. The drill A may operate from the remote side of the stock S. Again, the locator F may be bored axially to receive the drill A as shown in dotted lines. Counter-sinking of what will be the underface of the blank P is then effected by the countersink B, then tapping by the tap C from either side as convenient, and finally ejection by the blanking tool D of the finished blank P—in the form of a nut—from the strip.

As shown in Fig. 3, the locator may alternatively comprise a matrix H adapted to pass over the projecting blank P, in which case drilling is effected from the opposite side.

Fig. 4 shows the sequence of operations in an alternative method in which the above locator is dispensed with, and instead a blanking and centre popping or dimpling effected in one operation. 3 is a dimpling tool, and 7 is a blanking punch which has a blind hole for clearing the point of the dimple 3 in case of unintended operation without any stock inserted, and to allow displacement of metal due to the dimpling operation.

As the blanking tool presses out the blank, it presses it against the dimple 3 which gives against its spring (not shown) with the result that an accurately marked out centre pop or dimple is formed on the blank and serves to locate the drill. By using a spring, the dimpler, in addition to its being prevented from damaging the die, also acts as an ejector. My making the impression sufficiently large, the dimpling operation may also serve for chamfering the hole and so permit of tapping without burr.

The sequence of operations is, first the combined dimpling and blanking by the dimpler 3 and the die 7; then there is the drilling by the drill A. The subsequent operations are then as in the second method described with reference to Fig. 2 and reproduced in Fig. 4 to complete the showing, the break shown in the stock indicating that it has been reversed.

In both the methods in which the blanking operation is effected first, it has been found best to adjust the press die in setting up so that the piece leaves the tools approximately half way out of the stock. It is thus securely held in the stock and is able to withstand the subsequent operations of drilling, countersinking and tapping, yet is capable of easy ejection from the stock on the completion of the operations.

In the case of very thin nuts the countersinking of the underside may be performed by means of a countersinking drill preferably having a pilot to enter the drilled hole. Alternatively, an ordinary drill of the required diameter and with a point of a suitable angle may be employed, the said drill being guided to the exact centre of the nut by means of a hollow bushing as shown in Figs. 2 and 3.

Tapping is effected by holding the stock under a reversing tapping appliance of the usual type.

In the case of very thin nuts it may be found advantageous to pierce the hole instead of dimpling and subsequent drilling as in compound die practice.

The nuts are finally removed from the stock by a simple hand or machine operation.

Nuts which are slotted for a screw-driver present additional problems in very small sizes. This type of nuts is usually of round shape. The slotting operation may be carried out while the blank is in the stock and before tapping is carried out, the latter ensuring against the slotting forming troublesome burrs on the screw thread.

While metal has been referred to in the above description as the material from which the nuts are to be made, other material, such as plastics, which are suitable for the formation of screw threads, may be used.

It will be seen that with all the methods according to the invention every piece will be squarely tapped with respect to its faces. This is practically impossible with very small nuts tapped after severance from the stock; and the method according to the present invention is therefore a great advance on present methods.

With the method according to the present invention gauging is considerably simplified as compared with the gauging of nuts severed from the stock; for as against the awkwardness of inserting the gauge in a very small nut which it is difficult to hold whether by hand or by tweezers or by other means; with the method according to the present invention the nuts are held in the same relative position in the stock, so that the gauge can be inserted without difficulty at regular intervals along the stock. Inspection is also very easily carried out by means of a low power microscope or other optical device.

What I claim as my invention and desire to secure by Letters Patent of the United States is:

1. The method of manufacture of small drilled and tapped parts by pressing, wherein the piece is first blanked and partially ejected from the stock, and the forming of the hole and the tapping are effected prior to the piece being ejected from the stock.

2. The method according to claim 1, including the step of countersinking after forming of the hole and prior to tapping.

3. The method according to claim 1, wherein the location of the hole during the forming the hole is centered by the contour of the depression in the stock formed by the partial ejection of the blank therefrom.

4. The method according to claim 1, including the steps of countersinking after forming of the hole at what will be the underface of the blank, then tapping, and finally ejecting the finished blank.

5. The method according to claim 1, including the step of slotting of the blank prior to tapping.

6. The method according to claim 1, wherein the location of the hole during the forming of the hole is centered by the contour of the projecting portion of the stock formed by the partial ejection of the blank therefrom.

NORMAN HALL.